No. 823,237. PATENTED JUNE 12, 1906.
A. P. & C. H. WARNER.
MAGNETIC TACHOMETER.
APPLICATION FILED MAY 20, 1905.
2 SHEETS—SHEET 1.
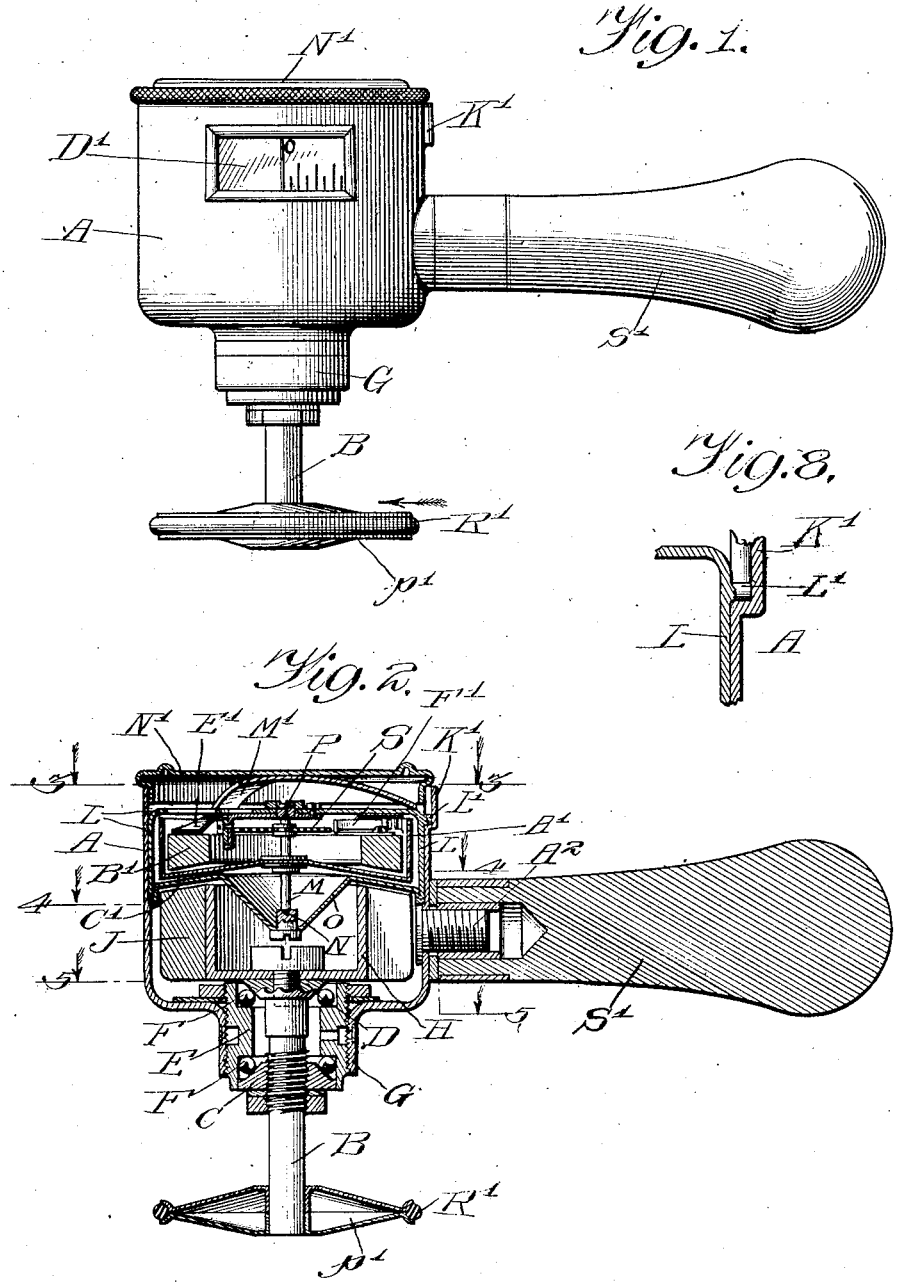

No. 823,237. PATENTED JUNE 12, 1906.
A. P. & C. H. WARNER.
MAGNETIC TACHOMETER.
APPLICATION FILED MAY 20, 1905.
2 SHEETS—SHEET 2.
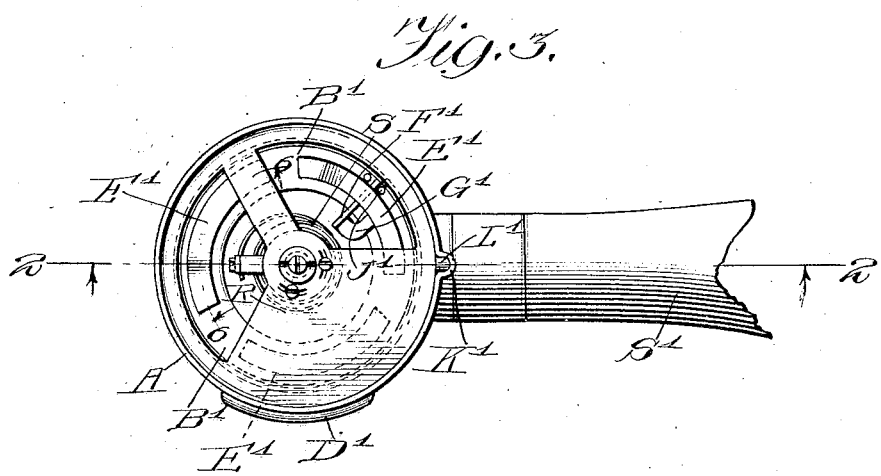
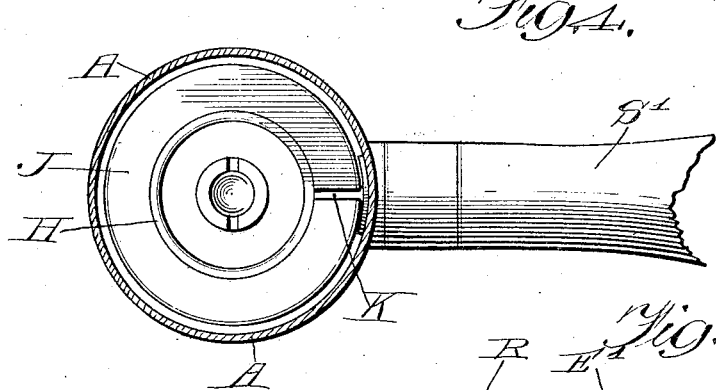
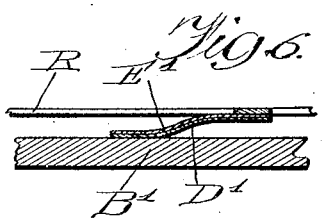
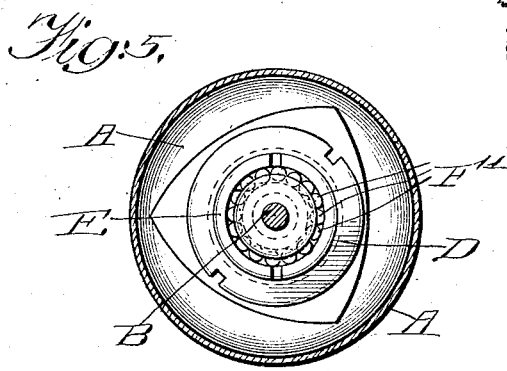
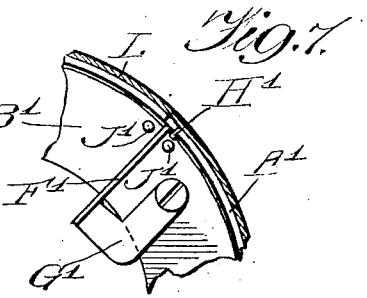
Witnesses:
J. B. Weir
Ja. P. Perry
Inventors
Arthur P. Warner
Charles H. Warner
By Brown & Darby
Attys

UNITED STATES PATENT OFFICE.

ARTHUR P. WARNER AND CHARLES H. WARNER, OF BELOIT, WISCONSIN, ASSIGNORS TO WARNER INSTRUMENT COMPANY, OF BELOIT, WISCONSIN, A CORPORATION OF WISCONSIN.

MAGNETIC TACHOMETER.

No. 823,237.    Specification of Letters Patent.    Patented June 12, 1906.

Application filed May 20, 1905. Serial No. 261,412.

*To all whom it may concern:*

Be it known that we, ARTHUR P. WARNER and CHARLES H. WARNER, citizens of the United States, residing at Beloit, in the county of Rock and State of Wisconsin, have invented a new and useful Magnetic Tachometer, of which the following is a specification.

This invention relates to magnetic tachometers and is designed as an improvement upon the magnetic tachometer set forth, described, and claimed in our Patent No. 745,468, granted December 1, 1903.

The object of the invention is to simplify and improve the construction of magnetic tachometers and to render the same more efficient in operation.

A further object of our invention is to provide means in a magnetic tachometer for automatically correcting the scale-reading for different temperatures.

A further object of the invention is to provide means for yieldingly arresting the rotative movement of the scale-disk upon the completion of one revolution thereof.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in side elevation of an apparatus embodying the principles of our invention. Fig. 2 is a view in central section on the line 2 2, Fig. 3, looking in the direction of the arrows. Fig. 3 is a view in plan on the line 3 3, Fig. 2, looking in the direction of the arrows, the end cap being removed. Fig. 4 is a view in section on the line 4 4, Fig. 2, looking in the direction of the arrows. Fig. 5 is a view in section on the line 5 5, Fig. 2, looking in the direction of the arrows. Fig. 6 is a broken detail view in section on the line 6 6, Fig. 3, looking in the direction of the arrows. Fig. 7 is a broken detail view in plan, showing the yielding limit-stop for the scale-disk. Fig. 8 is a broken detail view in section, showing means for properly assembling the casing.

The same part is designated by the same reference-sign wherever it occurs throughout the several views.

In our prior patent above referred to we have shown, described, and claimed a tachometer in which is employed a magnet and a magnetic mass mounted for relative rotation and an independently-rotative scale-disk interposed between the magnet and mass, whereby when rotation is imparted to the magnet a revolving magnetic field is generated or created, tending to impart a rotative movement to the scale-disk and to an extent or degree proportionate to the speed of rotation of the rotating part or member, the rotative movement of the scale-disk being opposed by a suitable spring, the tension of which is so proportionately adjusted as that the reading from the scale will indicate the speed at which the rotating member is running. The present invention relates to an apparatus of this general class and nature and resides specially in features of improvement hereinafter to be pointed out.

Referring to the accompanying drawings, reference-sign A designates a casing designed to receive and contain the parts of the tachometer.

B designates a shaft arranged to project into the casing A and designed to be operated by the moving part, the speed of movement of which is to be measured and indicated by the device. This shaft carries oppositely-presented bearing blocks or pieces C D, coöperating with shoulders formed on the end of a bearing-sleeve E to form a raceway for balls F, whereby the shaft B is journaled within a ball-bearing. The bearing-sleeve E is exteriorly threaded to be received in the interiorly-threaded hub portion G of the casing A. Upon the inner end of shaft B is clamped a sleeve H, of brass or other suitable non-magnetic material, upon which is carried the magnet J. This magnet is in the form of a split ring arranged to inclose the sleeve H, with the ends or pole-pieces only slightly separated from each other, as indicated at the point K, Fig. 4. Adapted to be received within the case A is an auxiliary or supplemental casing L, comprising a shell, and in the longitudinal center of said shell is a pin-shaft M, having bearing at one end in a bearing-block N, carried by the portion O of the auxiliary shell, and at its opposite end in a bearing-block P, carried in the center of the end wall R of the auxiliary shell or casing. The rotative movement of this pin-shaft M is yieldingly opposed in any suitable or convenient manner—as, for instance, by means of a hair or watch spring S. Connected to rotate with pin-shaft M is the scale-disk A'. Suitably supported within the auxiliary shell or casing L is a magnetic mass B', preferably in the form of a closed ring. The arrangement is such that when rotation is imparted to shaft B a revolving magnetic field is created in the space between the juxtaposed surfaces of magnet J and magnetic mass B'. Now by forming the scale-disk A' of a suitable material, preferably a material which is a conductor of electricity, thereby forming an armature, a rotative tension is imposed upon said scale-disk, tending to rotate the same. The rotary movement of the scale-disk, however, is opposed by the tension of spring S, the tension of which may be so adjusted and arranged as that the scale-disk will be rotatively displaced through a distance proportionate to the speed at which the magnet J rotates, it being understood that the scale-disk A' is interposed between the magnet J and the magnetic mass B'. In order to prevent air-currents generated by the rotating part of the tachometer affecting or influencing the rotative displacement of the scale-disk, a shield may be interposed between the scale-disk and the rotating part of the tachometer. In practice we employ for this purpose a protecting shield or plate C', constituting a bottom or floor for the auxiliary casing or shell L, and the central portion O thereof, in which the journal-stud N is mounted, has been hereinabove referred to. In the side of the auxiliary shell or casing and also in the side of the main casing A are formed openings (indicated at D') through which the scale-readings of the scale-disk may be disclosed, in practice the calibrations of the scale-disk being carried upon the ring or flange portion of such disk which encircles the magnetic mass B'.

As above indicated, the magnet J is in the form of a split ring, with the ends or poles brought into close proximity with respect to each other. We have found this feature of our invention most valuable and important, especially where the magnetic mass is in the form of a closed ring, for the reason that the magnet J is thereby made more permanent and is prevented from becoming demagnetized when revolved rapidly and also renders the device less liable to become affected by outside electrical or magnetic influences, and hence the results accomplished are rendered more accurate. This feature of construction and arrangement, while well adapted for use in connection with tachometers, is of equal value for use in the construction of electrical measuring and other devices, and we therefore do not desire to be limited in respect to the use to which this combination is to be put.

We have found in practice and in the practical operation of magnetic tachometers of the type and construction and character above referred to that by reason of change of electrical conductivity in the scale-disk A', due to variations of the atmospheric temperature, the scale-readings of the device are influenced and affected. It is among the special purposes of our present invention to provide means for automatically correcting this defect, and according to the temperature itself and in the accomplishment of this object we automatically vary in any suitable manner and according to the changes in the atmospheric temperature the magnetic reluctance in the field between the magnet and mass. To this end we propose in one form of our invention to support the magnetic mass B' so as to permit the opposed face of said mass to approach nearer to or to recede farther from the coöperating opposed face of the magnet J, according to the temperature. This result may be accomplished in many specifically different ways, and while we have shown and will now describe one arrangement for accomplishing this object we do not desire to be limited or restricted thereto. In the particular form shown we suspend or support the magnetic mass B' from the end piece or plate R of the auxiliary shell or casing L by means of metallic strips D' E'. (See Figs. 2 and 6.) In practice we employ three sets of such metallic strips, the two strips of each set being placed flatwise upon each other and brazed or otherwise secured together and at one end to a portion of the end plate R, and at the other end said strips are brazed or otherwise secured to the magnetic mass B', said strips being bowed or formed in the shape of leaf-spring strips, and in practice the strips D' E' are of different metals, having different coefficients of expansion. By this construction variations in the temperature will cause said suspending-strips to perform the function of a thermostat and will automatically vary the distance between the opposed faces of magnetic mass B' and magnet J according to the temperature, so as to maintain uniformity of magnetic condition in the field which acts upon the scale-disk. Consequently the readings of the instrument are not distorted or impaired by reason of any variation in the temperature, such variation being compensated by the thermostatic supporting or suspending strips D' E'. This we regard as a most important and valuable feature of our device.

The tension of spring S is so regulated as that the distance through which the scale-disk is rotatively displaced is proportional to the speed of rotation of the rotating part of the instrument. It is important, however, to provide means for preventing rotation of the scale-disk beyond one complete rotative movement, as otherwise the tension of spring S may be seriously impaired, and we propose to so calibrate the instrument as that it will ordinarily record the maximum speed of any moving part within the limits of one complete rotative movement of the scale-disk. If, however, the speed to be measured is such as to cause the scale-disk to make more than one complete revolution, then in order to prevent the rotation of the scale-disk beyond one complete revolution from imposing an undue strain upon the spring S we employ a yielding stop to arrest the rotative movement of the scale-disk and to prevent the same from rotating beyond that point. Many specifically different constructions of stops may be employed for this purpose. We have shown a simple arrangement, to which, however, we do not desire to be limited or restricted, wherein a spring-arm F' is carried upon a bracket G' suitably secured to the magnetic mass B', the free end of said spring-arm being arranged to engage a tongue H' or other projection, formed in or carried by the scale-disk A'. In order to prevent the spring-arm F' from rocking or swinging too far, we arrange stop-pins J' upon opposite sides thereof, as clearly shown in Fig. 7. In this manner we provide an exceedingly simple but yielding spring-stop arrangement for preventing rotative movement of the scale-disk beyond one complete revolution.

It is desirable to provide means whereby in assembling or inserting the auxiliary casing or shell L within the case A the parts be properly centered in order to bring the sight-holes, through which the scale-readings are disclosed, into proper register. This result may be accomplished in many specifically different ways. We have shown a simple arrangement for accomplishing the desired object wherein the shell or casing A is provided with an offset portion K', forming a channel or way extending longitudinally thereof, (see Figs. 1, 2, 3, and 8,) and we provide the auxiliary casing or shell L with a stud or projection L', arranged to be received and to move longitudinally through said channel or guideway, thus affording simple but efficient means for accomplishing the desired object of properly centering the parts when the one is inserted within the other.

If desired, and in order to maintain the inner shell or casing within the case A against movement endwise within said case A, which might destroy or interfere with the correctness of the reading of the scale, we place a spring-plate M' (see Fig. 2) over the end of the auxiliary shell or casing L and in position to be engaged by the inner surface of a removable cap or cover N' of the case A. From this construction it will be seen that when the cap or cover N' is screwed down into place to form an end cover for the main case the spring-plate M' is compressed, thereby firmly holding the inner case or shell in place.

The shaft B may be rotated in any suitable or convenient manner and to this end may be coupled or connected to rotate with the moving part the speed of which is to be measured. In the particular form shown, to which, however, our invention is not to be limited or restricted, we mount a wheel P' upon shaft B and provide the same with a tire R', arranged to bear against a convenient portion of the surface of the moving part the speed of movement of which is to be measured, and in order to afford a convenient means for holding the instrument when required for use we provide the same with a handle S', adapted to be received or screwed upon a threaded bolt or stud $A^2$, suitably supported by the casing A.

From the foregoing description it will be observed that we provide an exceedingly simple and efficient magnetic tachometer, wherein we employ a stationary magnetic mass and a revolving magnet, the relative rotations of which create or generate a magnetic field, through which is influenced a rotative scale-disk, the rotative displacements of which are proportionate to the relative speeds of the magnet J and the readings from which indicate at once the speed of movement to be measured. It will also be seen that automatic correction and compensation is provided for for variations in the atmospheric temperature.

It is obvious that many variations and changes in the specific details of construction and arrangement would readily occur to persons skilled in the art and still fall within the spirit and scope of our invention. We do not desire, therefore, to be limited or restricted to the exact details shown and described; but, Having now set forth the object and nature of our invention and a construction embodying the principles thereof, what we claim as new and useful and of our joint invention, and desire to secure by Letters Patent, is—

1. In a tachometer, a magnet and a magnetic mass, one of these parts mounted to rotate, a freely-rotative scale-disk interposed between said magnet and mass, and means for automatically compensating for variations in electrical effect due to variations in atmospheric temperature at which the instrument is operated.

2. In a tachometer, a magnet and a magnetic mass, one of these parts mounted to rotate, a freely-rotative scale-disk interposed between said mass and magnet, and means for relatively moving said mass and magnet toward and from each other according to the degree of atmospheric temperature under which the instrument is operated.

3. In a tachometer, a magnet and a magnetic mass, one of these parts mounted to rotate, and means for supporting said parts for relative movement toward and from each other, said means operating according to the atmospheric temperature to move said parts nearer to or farther from each other, and a freely-rotative scale-disk interposed between said mass and magnet.

4. In a tachometer, a magnet and a magnetic mass mounted for relative rotation, and a thermostatic support for one of said parts, and a freely-rotative scale-disk interposed between said mass and magnet.

5. In a tachometer, a magnet and a magnetic mass, one of these parts mounted to rotate, thermostatic strips suspending the other of said parts in proximity to the rotating part, and a freely-rotative scale-disk interposed between said magnet and mass.

6. In a tachometer, a magnet and a magnetic mass, one of these parts mounted to rotate, metallic strips arranged in sets, each set composed of strips of different metals and forming a support for one of said parts, and a scale-disk interposed between said parts.

7. In a tachometer, a magnet and a magnetic mass, one of said parts being in the form of a split ring and the other in the form of a closed ring, said parts mounted with their side surfaces or faces juxtaposed with reference to each other, and for relative rotation, and a scale-disk interposed between the juxtaposed side surfaces or faces of said parts.

8. In a tachometer, a main case, a magnet mounted therein for rotative movement, an auxiliary case, a magnetic mass mounted therein, said auxiliary case adapted to be removably received within said main case, means for yieldingly maintaining said auxiliary case within said main case, and a scale-disk interposed between said magnet and mass.

9. In a tachometer, a main case, a magnet mounted to rotate therein, an auxiliary case removably mounted within said main case, said main case having a screw-top, a magnetic mass carried by said auxiliary case, a scale-disk also carried by said auxiliary case and between said magnet and the magnetic mass, and a spring-plate bearing upon said auxiliary case and engaged by said screw-top to hold said auxiliary case in place.

10. In a tachometer, a magnet and a magnetic mass, one of these parts mounted to rotate, a scale-disk interposed between the magnet and mass and mounted for free rotation, and means for automatically varying the reluctance of the magnetic field between said magnet and mass according to variations in the atmospheric temperature.

11. The combination with a magnetic mass, a magnet in the form of a split ring with the ends or poles brought into close proximity, said magnet and mass arranged side by side and in parallel relation and an armature interposed between the juxtaposed sides or surfaces of the mass and magnet, one of these parts mounted to rotate.

In witness whereof we have hereunto set our hands, this 10th day of May, 1905, in the presence of the subscribing witnesses.

ARTHUR P. WARNER.
CHARLES H. WARNER.

Witnesses:
  JAS. BARCLAY,
  A. S. KOTO.